March 15, 1966   T. WICKSTROM ETAL   3,240,117
SLIDE HOLDER WITH INTEGRAL SOUND TRACK
Filed Nov. 13, 1961   4 Sheets-Sheet 1

Theodore Wickstrom
Edward Mankus
Carl W. Claras
Rudolph A. Rom
Robert L. Moore
INVENTORS BY Ooms, McDougall and Hersh
Att'ys March 15, 1966    T. WICKSTROM ETAL    3,240,117
SLIDE HOLDER WITH INTEGRAL SOUND TRACK
Filed Nov. 13, 1961    4 Sheets-Sheet 2
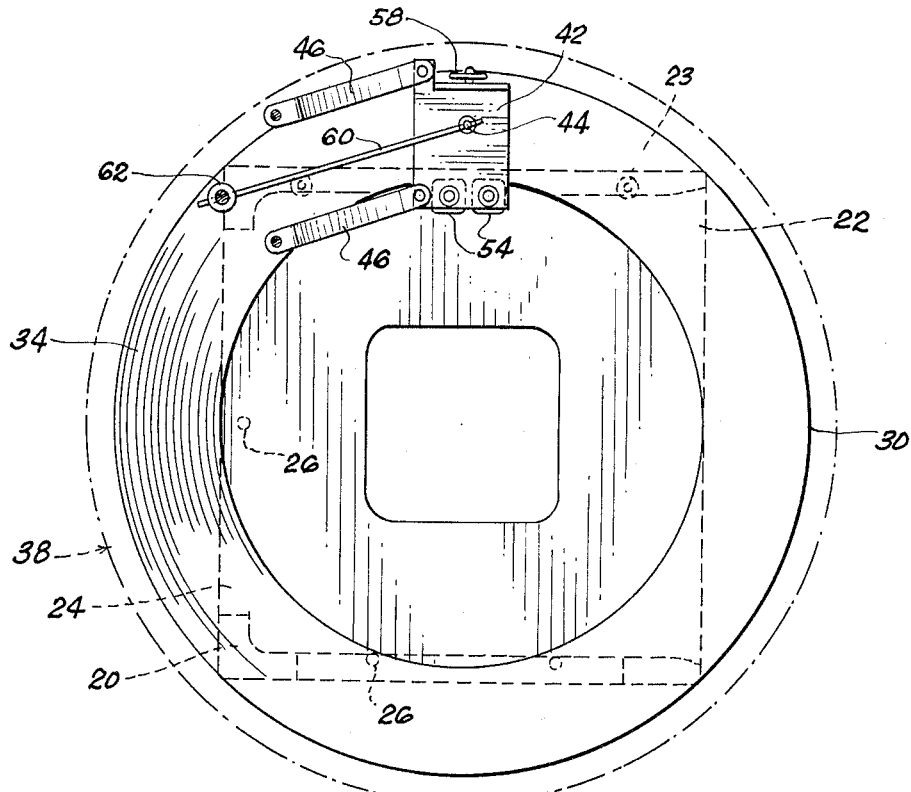
FIG. 2
FIG. 3
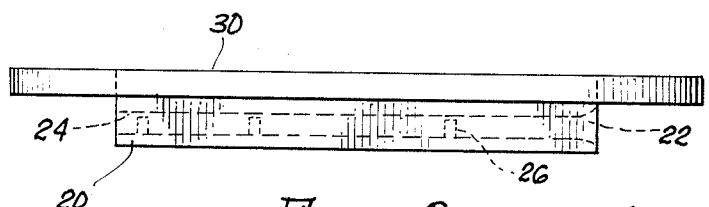
Theodore Wickstrom
Edward Mankus
Carl W. Claras
Rudolph A. Rom
Robert L. Moore
INVENTORS
BY
Ooms, McDougall and Hersh
Attys

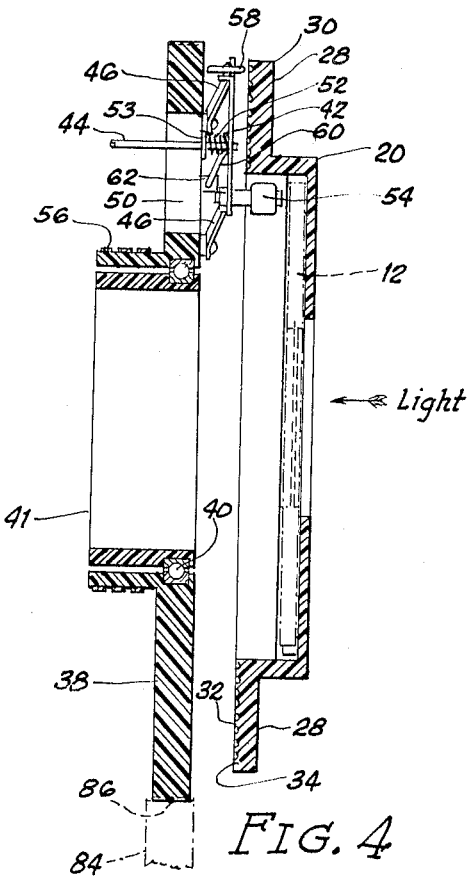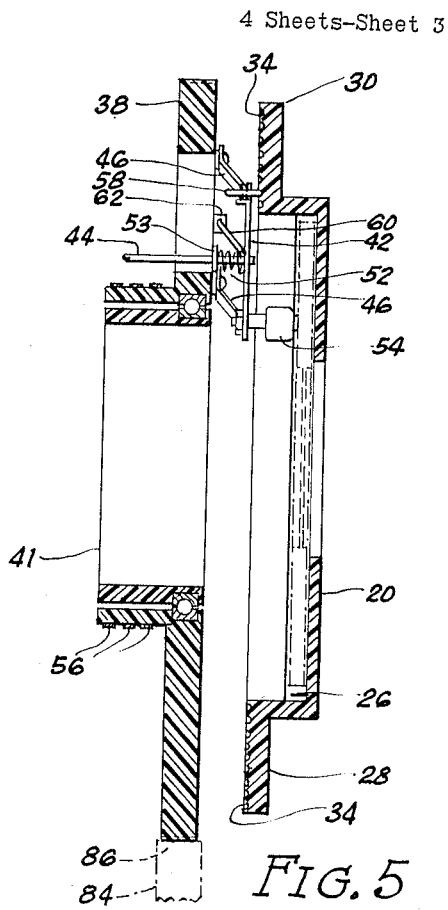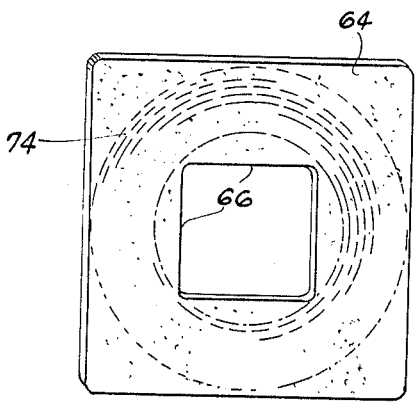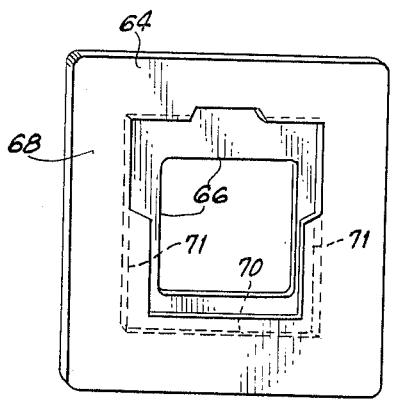

March 15, 1966 T. WICKSTROM ETAL 3,240,117
SLIDE HOLDER WITH INTEGRAL SOUND TRACK
Filed Nov. 13, 1961 4 Sheets-Sheet 4
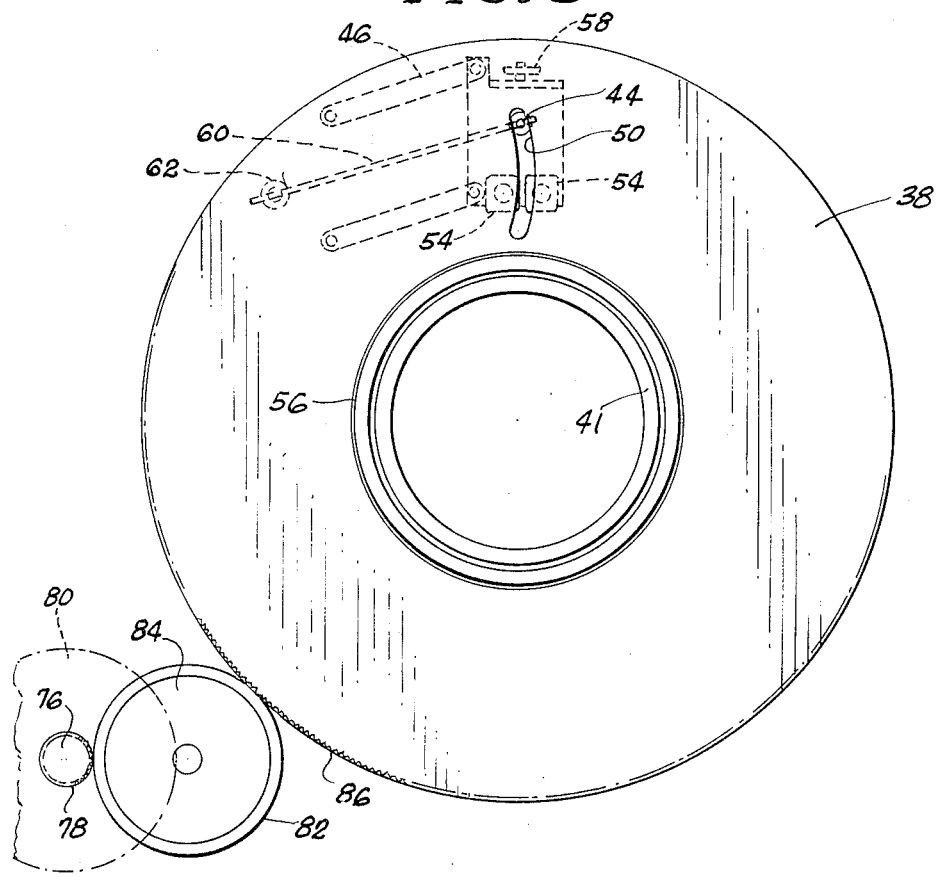
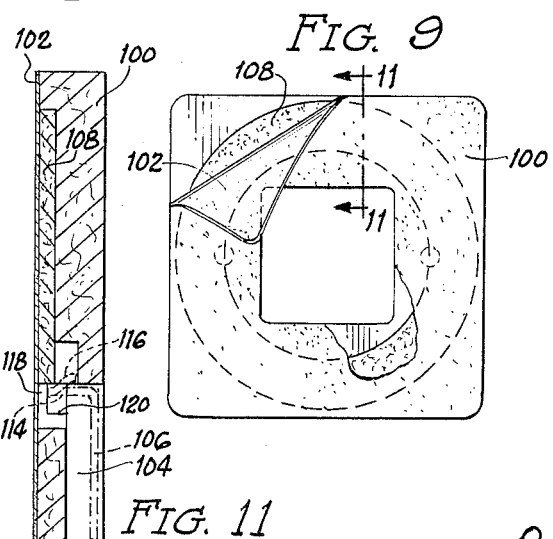
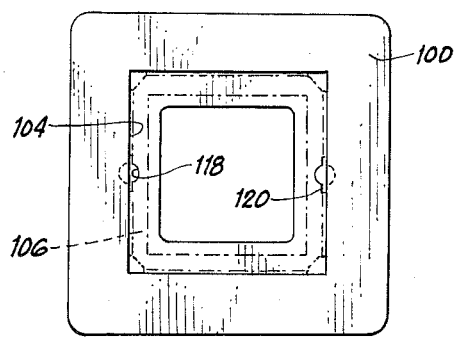
INVENTOR.
BY Ooms, McDougall and Hersh
Att'ys

United States Patent Office 3,240,117
Patented Mar. 15, 1966

3,240,117
SLIDE HOLDER WITH INTEGRAL SOUND TRACK
Theodore Wickstrom, Skokie, Edward Mankus, Chicago, Carl W. Claras, Western Springs, Rudolph A. Rom, Berwyn, and Robert L. Moore, La Grange, Ill., assignors, by mesne assignments, to Minnesota Mining and Manufacturing Company, St. Paul, Minn., a corporation of Delaware
Filed Nov. 13, 1961, Ser. No. 151,936
1 Claim. (Cl. 88—28)

This invention relates to improvements in slide projectors and in particular to an improved holder for slides and to improved projector mechanisms for operating with the slide and holder assembly. Specifically, the present invention provides slide assemblies which carry or are adapted to receive a sound track. In addition, the invention provides a novel mechanism for enabling production of sound concurrently with the projection of a slide in a projector.

There are many obvious advantages of slide projectors wherein a transparency is magnified many times while being projected on a screen. This technique permits detailed inspection of various subjects for indefinite periods of time. In addition, slide projection is particularly suitable for accompaniment by speech and other sounds which bear a relation to the picture. It is well known that slide projectors are extensively used for educational purposes and techincal lectures. In addition, the projectors are widely used by individuals since a great deal of time can be taken to explain the details and circumstances relating to a particular picture.

Existing slide projector techniques suffer from the disadvantage that a speaker must be present to provide accompanying sound. In some instances, where an independent sound track is provided, the slides must be coordinated with the sound track and therefore they must be shown in perfect order and in a carefully timed sequence. It is apparent that such techniques are not satisfactory, since one familiar with the slides may not be available at all times. Furthermore, the details and circumstances relating to a particular subject may be forgotten after a substantial lapse of time. Even where an independent sound track is available, the need for presenting the slides in a specific order and within a particular time naturally detracts from the otherwise advantageous use of slide projection.

It is an object of this invention to provide an improved technique for use in conjunction with a slide projector whereby an audible recording can be provided for each slide and whereby the recording can be heard while projecting the picture on a screen.

It is an additional object of this invention to provide an improved slide assembly which is adapted to carry a sound track.

It is a further object of this invention to provide a novel mechanism which enables the production of sound concurrently with the projection of slides contained within the above mentioned assemblies.

It is a further object of this invention to provide a slide projecting technique which overcomes the disadvantages of the prior art since a permanent audible record is adapted to be provided for individual slides whereby the need for a speaker familiar with the slide subject matter is eliminated and whereby projection of slides need not be confined to a particular order or to a particular timed sequence.

These and other objects of this invention will appear hereinafter and for purposes of illustration, but not of limitation, specific embodiments of this invention are shown in the accompanying drawings in which—

FIGURE 2 is an elevational view of the slide holding and positioning means and the audio and drive mechanisms of this invention;

FIGURE 3 is a plan view of the slide positioning means of this invention;

FIGURE 4 is a vertical section illustrating the slide positioning means and the audio and drive mechanisms in their open position;

FIGURE 5 is a vertical section of the structure shown in FIGURE 4 in the operating position;

FIGURE 6 is a front end view of a slide holder adapted for use in accordance with this invention;

FIGURE 7 is a rear end view of the holder of FIGURE 6;

FIGURE 8 is a diagrammatic illustration of the mechanisms of this invention and a drive means therefor;

FIGURE 9 is a front end view of an alternative slide holder;

FIGURE 10 is a rear end view of the slide holder of FIGURE 9;

FIGURE 11 is an enlarged detail view taken about the line 11—11 of FIGURE 9;

FIGURE 12 is an elevational view of a slide retainer means adopted for use in combination with the slide holder of FIGURE 9; and FIGURE 13 is a slide view of the retainer means of FIGURE 12.

Figure 1:
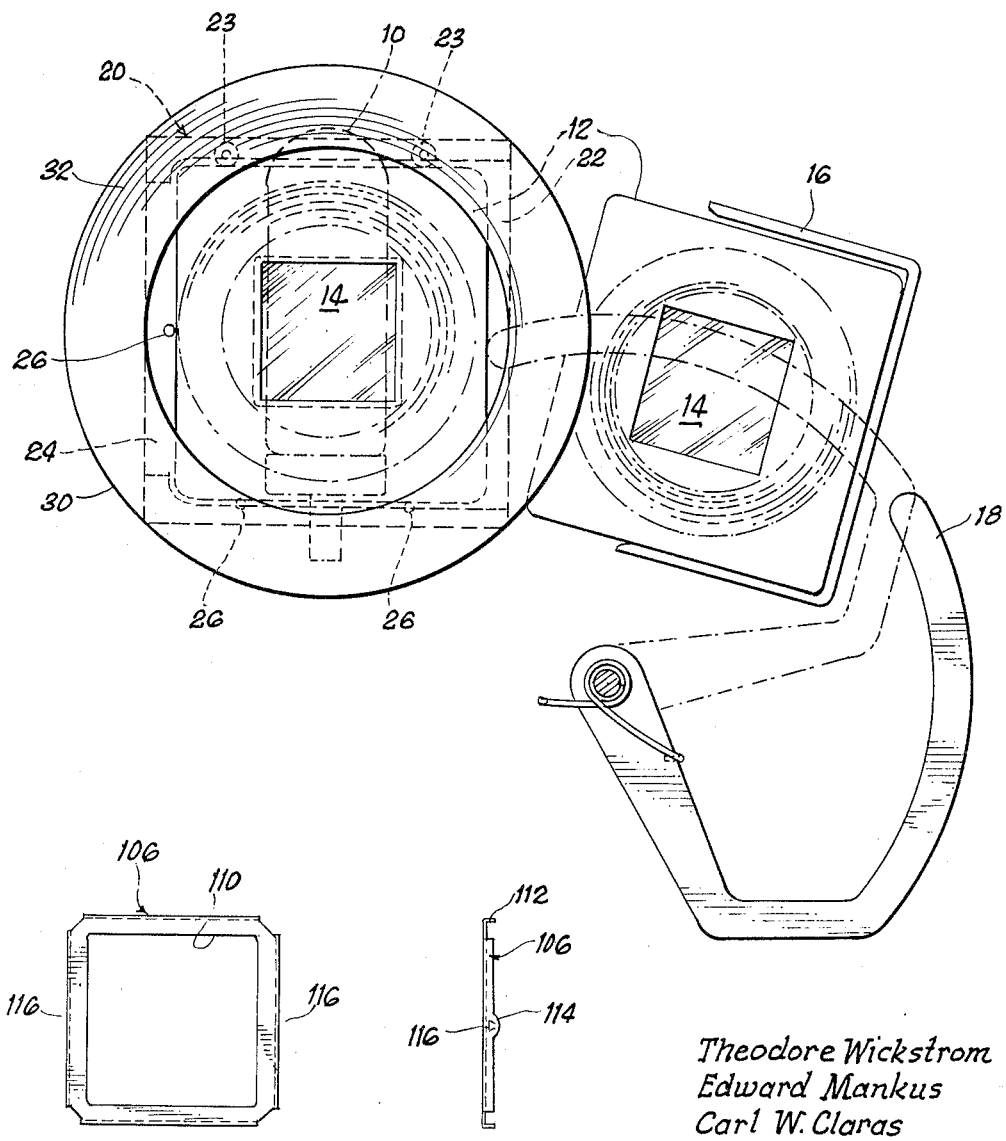
FIGURE 1 is a schematic illustration of a slide projector mechanism of the type which can be employed in the practice of this invention.

The present invention provides a system which includes a slide projector provided with means for positioning a slide assembly within the projector housing. The slide assembly includes the slide to be projected as well as a holder having a magnetic track on one face. A rotating audio head is adapted to be mounted within the projector and is provided for traversing the magnetic track whereby a recording may be made on the track and whereby playback of a recording can be accomplished.

The slide assembly which is provided for insertion into the projector includes the holder and slide above mentioned. The holder is provided with an open space between its faces for insertion of the slide. The structure is designed whereby the transparency of the slide will be accurately positioned within the holder and whereby the assembly can be accurately positioned within the projector. In the case of this invention, positioning of the assembly is important for providing consistent video projection and also for providing suitable audio reproduction.

In the preferred form of this invention, the projector is provided with a plate having positioning means for the slide assembly on one face. A spiral groove is formed in the other face of the plate to serve as a guide means for the audio head. The audio head is associated with a wheel which is adapted to ride in the spiral groove whereby the head will be adapted to traverse a spiral path with respect to the magnetic track formed on the slide assembly. This special form of the invention in addition provides for the use of a pair of heads which function to erase previous recordings as well as functioning to record and play back sound.

The present invention will be more readily understood when considering the accompanying drawings. FIGURE 1 illustrates a typical slide projector set-up wherein a light source 10 is mounted behind a slide holder assembly 12 whereby the images on the transparency 14 can be projected on a screen. In the schematic illustration shown, a plurality of slide assemblies 12 are adapted to be aligned in the container 16 for automatic loading into the projector by means of the spring loaded arm 18. A similar arm moving from the opposite direction can be provided for ejecting a previously projected slide assembly prior to insertion of a succeeding assembly.

A positioning means for the slide assemblies comprises a frame 20 which is provided with an opening 22 for loading of the slide assemblies. A second opening 24 in the positioning means 20 provides for insertion of an ejector arm and removal of the slide assemblies. The assemblies are accurately positioned with respect to the means 20 by means of bosses 26 which extend across the frame opening and by means of spring urged rollers 23 which are mounted at the top of the means 20 and which urge the assemblies downwardly. Accurate positioning of the slide assemblies is important since the transparency must be centered for satisfactory projection. The positioning is additionally important due to the audio characteristics of the slide assembly since the audio heads must be accurately located with respect to the magnetic track.

The mechanism shown in FIGURE 1 is presented only for purposes of illustration, and it will be apparent that the concepts of this invention are equally applicable where slide assemblies are manually inserted and replaced.

The frame 20 is fixed to the face 28 of a plate 30 (see FIGURES 4 and 5). On the opposite face 32 of the plate there is provided a spiral groove 34 which comprises a guiding means for the audio head of the mechanism. Located adjacent the plate 30 within the projector housing there is provided a disc 38 which is mounted for rotary movement on the bearings 40 which are fitted into the hollow fixed shaft 41. A stamping 42 is movably secured with respect to the disc by means of pivotally mounted arms 46. A pin 44 is provided for sliding movement in the slot 50 and is connected to any convenient means (not shown) moving the pin and associated stamping toward and away from the plate 30. A compression spring 52 and washer 53 fit around the pin 44, the spring being provided for normally urging the stamping 42 away from the disc.

Fixed on the stamping 42 are one or more heads 54 which may include an erasing head as well as a recording and playback head. Combination of erasing and recording heads in any well known manner is contemplated, and in the construction shown current can be fed to the heads through conductors (not shown) which are in a circuit which includes the slip ring contacts 56.

Also connected to the stamping 42 is a wheel 58 which is adapted to ride in the spiral groove 34. A spring arm 60 is provided with one end secured to stud 62 located on the disc 38. The other end of the leaf spring 60 is secured at the base of the pin 44 where this pin joins the stamping 42. In operation, the spring 60 normally urges the stamping 42 and its associated heads toward the outer periphery of the grooved plate 30. As will appear when the stamping 42 is moved by means of pin 44 to the position shown in FIGURE 5, the wheel 58 is adapted to ride in the groove 34 whereby the stamping 42 and its associated heads are moved toward the center of the plate in opposition to the spring 60. It will also become apparent that the spring 60 serves as a return means for the mechanism whereby the heads will be reset after completing a recording or playback cycle. Thus the spring 60 will serve to return the stamping 42 when the pin 44 is pulled back and the wheel 58 is moved out of groove 34.

FIGURES 6 and 7 illustrate a slide holder 64 which is provided with a central opening 66 whereby a transparency 14 is adapted to be projected. The holder 64 includes an open rear face 68 with recesses 70 and 71 formed in the bottom and sides respectively. A slide is adapted to be moved into the open space and to seat in the recesses whereby the holder and slide assembly can be inserted in a projector.

On the other face of the holder 64 there is provided a sound track 74 which is preferably a magnetic film such as an iron oxide film of the type commonly used in the recording art. The slide positioned within the holder may be a conventional size slide of the 35 mm. or 127 type or any other size desired.

FIGURES 9, 10 and 11 illustrate a modified form of slide holder 100 which can be employed as an alternative to the holder 64. On one surface the holder carries a magnetized tape 102. The opposite surface of the holder has an enlarged opening 104 for receiving a slide retainer 106 (see FIGURES 12 and 13).

The slide holder 100 is characterized by the provision of an annular resilient insert 108 beneath the tape 102. The insert is placed beneath that part of the tape 102 which will be tracked by the heads 54 when the holder is in the projector. This insert, which may be formed of any resilient material, such as molded polystyrene (#309 Hi-heat, Hi-impact), insures greater audio fidelity since the audio heads will press against the tape 102 with more uniform pressure. The insert 108 will give beneath the tape and any surface irregularities or other circumstances which would otherwise cause non-uniform traversal by the heads will not result in audio difficulties. Various other materials such as natural or artificial sponge materials, foamed rubber or foamed synthetics can also be employed for the insert 108.

The slide retainer 106 shown in FIGURES 12 and 13 comprises a generally rectangular frame enclosing opening 110. A mounted transparency can be readily fitted in friction tight engagement with the out-turned edges 112 of the retainer.

The retainer is provided along its sides with an enlarged portion 114 and a stamped out nipple-like member 116. The portion 114 and the member 116 are adapted to cooperate with the the bores 118 and the slots 120 formed in the slide holder 100 whereby the retainer is adapted to be quickly and securely fastened to the holder. The slot 120 provides a seat for the enlarged portion 114 and, as shown in FIGURE 11, the member 114 is adapted to snap into the bore 118. The resiliency of the retainer 106, which may be a thin metal or plastic member, and of the holder 100, which may be cardboard or plastic, permits simple insertion and removal of the retainers as desired.

In accordance with the techniques of this invention, the disc 38 is adapted to be rotated along with the associated heads whereby the heads will traverse the magnetic track 74 after the slide assembly is inserted in the projector. Several alternatives are available for rotating the disc, among them the drive means shown in FIGURE 8. In this schematic illustration, a drive pinion 76 having a knurled surface 78 is operatively connected to the motor 80. The surface 78 is adapted to engage the rubber surface 82 of the wheel 84 and this rubber surface in turn engages the knurled surface 86 of the disc 38. With this arrangement, an extremely smooth drive can be accomplished which will permit satisfactory sound reproduction.

The slide holders 64 or 100 are adapted to be provided to a user without any recording thereon. A particular slide can therefore be inserted into a holder and the slide assembly inserted into a projector of this invention. In an operation of this type, employing the mechanisms shown in FIGURE 1, the slide assemblies 12 can be loaded by means of the arm 18 into the slide positioning frame 20. After insertion of the slide, the pin 44 can be actuated whereby the wheel 58 will be moved into position in the outermost portion of the groove 34 and whereby the audio heads 54 will be positioned.

The drive mechanism, once it is made operative, will cause the disc 38 to rotate and as the wheel 58 follows the groove 34, the audio heads 54 will be caused to traverse the magnetic track. In a recording operation, the desired record is made on the track in the conventional fashion, as by speaking into a microphone during rotation of the recording head.

After completion of the recording cycle, the pin 44 is retracted and the action of spring 60 will result in return of the wheel 58 and heads 54 to their original position. Return of the wheel into groove 34 will now permit playback of the recorded material.

Obviously, a slide holder with a recording previously made can be simply inserted in the mechanism and played back as many times as desired. Similarly, with the mechanism set to erase, the erasing head will be operative during a rotating cycle, and this operation can be carried out on any slide holder desired.

In considering the operation, it will be apparent that the provision of the particular mounting means for the heads 54 is important. The mounting means is of the pantographic type and the heads 54 are caused to traverse a path which is approximately a radial path with respect to the disc 38. With this movement of the heads, they are at all times presented to the magnetic track at exactly the same angle. It is necessary to so present the heads, since if they are presented at varying angles, sound distortion will result.

The provision of an erasing head in the mechanisms of this invention is desirable since with this feature a particular slide holder 64 or 100 can be used for different slides. Specifically, the arrangement enables replacement of an old slide and insertion of a new slide, after which a new recording can be provided while the old recording is erased.

It will be apparent that there has been disclosed a slide projector apparatus which provides slide assemblies for carrying or receiving sound tracks. In addition, there is provided a projector mechanism which enables reproduction of the sound concurrently with the projection of the particular subject on the slide. There are many obvious advantages of this system over silent slide projection. Furthermore, a great deal of convenience is provided by the concepts of this invention, since concurrent lecture and independent sound mechanisms can be eliminated. In addition, it will be noted that the slide assemblies are each provided with individual integrated sound tracks and therefore the order of showing of slides is not critical and the particular time of showing is not necessarily limited to a particular timed sequence.

It will be understood that various modifications may be made in the above described slide projector improvements which provide the characteristics of this invention without departing from the spirit thereof, particularly as defined in the following claim.

We claim:

A holder for slides used in slide projectors, said slides comprising a transparency and a mounting to which said transparency is permanently fixed, said holder comprising a relatively narrow substantially rectangular frame portion defining a front face and a rear face, a central opening defined in said holder dimensioned to correspond to the transparency of a slide, a pocket defined inwardly of the rear face of said holder dimensioned to receive said mounting whereby said transparency can be positioned in line with said opening, said pocket including top and bottom walls and opposed side walls, a first flange formed integrally with said rear face and extending as a continuation of said rear face inwardly from said bottom wall, and additional flanges formed integrally with said rear face and extending as continuations of the rear face from either side of said first flange for a distance part way along said side walls, a cut-away portion defined along the top edge of said pocket whereby the top edge of a slide in said pocket can be gripped by the fingers to facilitate removal of the slide, and a sound track integrally formed on the front face of said holder, said sound track surrounding said central opening.

References Cited by the Examiner

UNITED STATES PATENTS

| | | | |
|---|---|---|---|
| 1,864,519 | 6/1932 | Boularan | 352—26 |
| 1,913,913 | 6/1933 | Boularan | 352—26 |
| 2,599,382 | 6/1952 | Goldberg | 40—152 |
| 2,961,922 | 11/1960 | Schwartz et al. | 88—28 |
| 3,057,255 | 10/1962 | Bregman | 88—28 |
| 3,063,338 | 11/1962 | Bregman | 88—28 |
| 3,122,054 | 2/1964 | Dimitracopoulos et al. | 88—28 |

FOREIGN PATENTS 1,045,122  11/1958  Germany.

EVON C. BLUNK, *Primary Examiner.*

EMIL G. ANDERSON, NORTON ANSHER,
*Examiners.*